United States Patent
Oncel et al.

(10) Patent No.: US 12,485,160 B2
(45) Date of Patent: Dec. 2, 2025

(54) STABLE LYOPHILIZED FORMULATION FOR HYBRID FC FUSED G-CSF

(71) Applicant: ILKOGEN ILAÇ SANAYI VE TICARET A.S., Istanbul (TR)

(72) Inventors: Hatice Oncel, Istanbul (TR); Emine Duygu Daglikoca, Istanbul (TR); Adem Sahin, Ankara (TR); Meltem Çorbacioglu Pala, Istanbul (TR); Aylin Özkan, Istanbul (TR); Onur Pinarbasli, Çankaya-Ankara (TR); Nagehan Sarracoglu, Çankaya-Ankara (TR)

(73) Assignee: ILKOGEN ILAÇ SANAYI VE TICARET A.S., Pendik/Istanbul (TR)

( * ) Notice: Subject to any disclaimer, the term of this patent is extended or adjusted under 35 U.S.C. 154(b) by 1035 days.

(21) Appl. No.: 17/608,351

(22) PCT Filed: May 22, 2020

(86) PCT No.: PCT/TR2020/050444
§ 371 (c)(1),
(2) Date: Nov. 2, 2021

(87) PCT Pub. No.: WO2020/242419
PCT Pub. Date: Dec. 3, 2020

(65) Prior Publication Data
US 2022/0288167 A1    Sep. 15, 2022

(30) Foreign Application Priority Data
May 28, 2019 (EP) .................................... 19177024

(51) Int. Cl.
*A61K 38/19* (2006.01)
*A61K 9/16* (2006.01)
*A61K 9/19* (2006.01)

(52) U.S. Cl.
CPC .......... *A61K 38/193* (2013.01); *A61K 9/1623* (2013.01); *A61K 9/1641* (2013.01); *A61K 9/19* (2013.01)

(58) Field of Classification Search
CPC ...... A61K 38/193; A61K 9/19; A61K 9/1623; A61K 9/1641
See application file for complete search history.

(56) References Cited

U.S. PATENT DOCUMENTS

| 8,586,048 B2 * | 11/2013 | Yang .......................... A61P 5/06 536/23.4 |
| 2009/0258017 A1 | 10/2009 | Callahan et al. |
| 2012/0276043 A1 | 11/2012 | Yang et al. |
| 2018/0099049 A1 * | 4/2018 | Tang ...................... A61K 47/10 |

FOREIGN PATENT DOCUMENTS

| WO | 2011090305 A2 | 7/2011 |
| WO | WO-2015150968 A2 * | 10/2015 ........... A61K 38/196 |
| WO | 2018/068012 A1 | 4/2018 |

OTHER PUBLICATIONS

Liuquan Lucy Chang, et al., "Effect of sorbitol and residual moisture on the stability of lyophilized antibodies: Implications for the mechanism of protein stabilization in the solid state", Journal of Pharmaceutical Sciences, American Pharmaceutical Association, Jul. 1, 2005, pp. 1445-1455, vol. 94, No. 7.
International Search Report for PCT/TR2020/050444 dated Sep. 11, 2020 (PCT/ISA/210).
Written Opinion for PCT/TR2020/050444 dated Sep. 11, 2020 (PCT/ISA/237).

\* cited by examiner

*Primary Examiner* — Xiaozhen Xie
(74) *Attorney, Agent, or Firm* — Sughrue Mion, PLLC

(57) ABSTRACT

A formulation including a stable lyophilized formulation prepared by lyophilizing an aqueous preparation and the lyophilized composition is reconstituted before use is disclosed. The formulation is suitable for administration via a subcutaneous (SC) route and contains an Fc fused to granulocyte colony stimulating factor (G-CSF) molecules via peptide bond. The formulation also contains a stabilizer, surfactant, and buffer, at pH value of the formulation that is between 3.8 and 5.2.

7 Claims, 2 Drawing Sheets
Specification includes a Sequence Listing.

Figure 2 signal sequence          N-term G-CSF
MAGPATQSPMKLMALQLLLWHSALWTVQEA*TPLGP*ASSLPQSFLLKCLEQVRKIQG
DGAALQEKLCATYKLCHPEELVLLGHSLGIPWAPLSSCPSQALQLAGCLSQLHSGL
FLYQGLLQALEGISPELGPTLDTLQLDVADFATTIWQQMEELGMAPALQPTQGAMP
                          hy-Fc
AFASAFQRRAGGVLVASHLQSFLEVSYRVLRHLAQP*RNTGRGGEEKKKEKEKEEQ*
*EERETKTPECPSHTQPLGVFLFPPKPKDTLMISRTPEVTCVVVDVSQEDPEVQFNWY*
*VDGVEVHNAKTKPREEQFNSTYRVVSVLTVLHQDWLNGKEYKCKVSNKGLPSSIEK*
*TISKAKGQPREPQVYTLPPSQEEMTKNQVSLTCLVKGFYPSDIAVEWESNGQPENN*
*YKTTPPVLDSDGSFFLYSRLTVDKSRWQEGNVFSCSVMHEALHNHYTQKSLSLSLG*
*K* (SEQ ID NO: 1)

STABLE LYOPHILIZED FORMULATION FOR HYBRID FC FUSED G-CSF

CROSS REFERENCE TO RELATED APPLICATIONS

This application is a National Stage of International Application No. PCT/TR2020/050444 filed May 22, 2020, claiming priority based on European Patent Application No. 19177024.7 filed May 28, 2019.

SEQUENCE LISTING

The content of the electronically submitted sequence listing, file name: Sequence_Listing_As_Filed.txt; size: 4,069 bytes; and date of creation: Nov. 2, 2021, filed herewith, is incorporated herein by reference in its entirety.

TECHNICAL FIELD

The present invention is related to the stable lyophilized formulation compositions comprising $3^{rd}$ generation G-CSF of hybrid Fc fused to Granulocyte Colony Stimulating Factor (G-CSF) molecules via peptide bond, suitable for administration via a subcutaneous (SC) route.

PRIOR ART

Market of antibodies and Fc fusion proteins is increasing each passing day. Up to now, 74 antibodies or Fc fusion proteins have been approved by at least one major authority and 11 of them are Fc fusions (Strohl, W. R., *Current progress in innovative engineered antibodies. Protein Cell,* 2017). Fc fusion proteins are composed of the active ingredient in protein or peptide structure and Fc domain. By this way the short half-life of protein or peptide could be extended from hours to days (Wu, B. and Y. N. Sun, *Pharmacokinetics of Peptide-Fc fusion proteins. J Pharm Sci,* 2014. 103(1): p. 53-64.). The first commercialized Fc fusion protein Enbrel®, approved by the Food and Drug Administration (FDA) in 1998 for therapeutic use in rheumatoid arthritis, was listed in the top 10 bestselling drugs worldwide with $8.874 billion sales in 2016. It is foreseen that Fc fusion proteins will continue to make an enormous impact on the pharmaceutical industry in upcoming years (Strohl, W. R., *Current progress in innovative engineered antibodies. Protein Cell,* 2017). When dosage forms of Fc fusion proteins are evaluated, it is seen that four of Fc fusion proteins have been marketed only in liquid form and five have been marketed only in lyophilized form. The rest two have been formulated as both in liquid and lyophilized forms. This clearly shows that lyophilization method is frequently used to stabilize Fc fusion proteins. Besides, for many cases lyophilized formulation and lyophilization process have been shown to increase the stability of proteins, as well (Siew, A., *Freeze Drying Protein Formulations, Pharmaceutical Technology, Volume* 38, Issue 5, 2014)

Generally, proteins have a very short half-life, and undergo denaturation (such as aggregation, dissociation, and adsorption on the surface of vessels) up on exposure to various different factors such as unfavorable temperatures, water-air interface, high-pressure, physical/mechanical stress, organic solvents and microbial contamination. Consequently, the denatured protein loses intrinsic physicochemical properties and physiological activity. Denaturation of proteins is often irreversible, and therefore proteins, once denatured, may not recover their native properties to the initial state and eventually collapse in aggregates.

A typical approach to minimize aggregation is to restrict the mobility of proteins in order to reduce the number of collisions. To overcome the instability of proteins in aqueous formulations, therapeutic protein products are made more stable via lyophilization (freeze-drying). Lyophilized products are usually accompanied by sterile aqueous media for reconstitution.

In EP0674524B1, a stable lyophilized formulation and process for G-CSF was described. This formulation consist of G-CSF and a stabilizing amount of at least one stabilizing agent selected from the group consisting of maltose, cellobiose, gentiobiose, isomaltose, and sucrose, wherein aqueous solution has a pH of 7-8. In U.S. Pat. No. 9,283,260B2, a stable lyophilized therapeutic peptibody composition such as 1 to 100 mg/mL Fc-Myo binding peptide comprising 10 mM histidine as a buffer, 4% w/v mannitol as a bulking agent, 2% w/v sucrose as a stabilizing agent, and 0.004% w/v polysorbate-20 as a surfactant was described. In EP2945593A4, a process for producing a lyophilized pharmaceutical composition containing a protein was described and in EP3125923A2, a lyophilized pharmaceutical composition comprising Romiplostim, buffer which is selected from the group consisting of citrate, phosphate, alanine, glycine, arginine or a combination thereof, Polysorbate 20 as surfactant and bulking agent selected from sucrose, trehalose or a combination was described.

The Hybrid Fc (hyFc) platform, which is the molecule of interest tested to be lyophilized and stabilized in this present invention, has been invented both to further improve plasma half-life of the conjugated drugs and to minimize the cytotoxicity and immunogenicity (EP20080766022, U.S. Pat. No. 8,586,038B2). For this purpose, two different immunoglobulins having no ADCC and CDC response were genetically combined. Hybrid Fc is derived from combinations of human IgG subclasses or combinations of human IgD and IgG. The hybrid Fc is effective, when joined to a biologically active molecule, to increase serum half-life of the biologically active molecule as well as increase expression level of the polypeptide when a nucleotide coding for the Fc-polypeptide fusion protein is expressed. Thus, Hybrid Fc (hyFc)-Fused G-CSF also has a longer plasma half-life, efficient expression level, eliminated cytotoxicity and reduced immunogenicity (U.S. Pat. No. 8,586,048 B2). In this respect, hy-Fc fused G-CSF is a unique and originator molecule, where the Fc part itself is a fusion of two immunoglobulin molecules and this first fusion is further fused to the active molecule. As this structure requires attention to the stability of both the Fc fusion part and the G-CSF part, it is different than other regular Fc fusion drugs and requires additional different and unique solutions for constituting its stability. In this regard, for the present invention, literature studies about the stability of regular Fc fusion proteins were done but the invention itself was done as per the specific needs of this unique hy-Fc fused G-CSF (U.S. Pat. No. 8,586,048 B2).

In the earlier PCT Patent Application PCT/TR2018/050208, a process is described for a stable hybrid Fc fusion G-CSF liquid formulation. The liquid form of administration is characterized in particular comprising hybrid Fc fusion G-CSF in a pH range of between 3.8 and 6.5, preferably between 4.0 and 4.6.

In this present invention, a stable lyophilized formulation of hy-Fc fused G-CSF, described in U.S. Pat. No. 8,586,048B2, was developed and demonstrated with examples.

Description of the Problem

Many Fc fusion proteins were demonstrated to have instability in liquid formulations. While range of aggregation is 0.1-1% per year for recombinant antibody liquid formulations, aggregation of Fc fusion proteins is 1-10% per year in liquid formulation. As shown by Cao et al. in the presence of water, stability of Fc fusion proteins were significantly influenced and chemical degradation occurred (Cao, W. et al., *Formulation, Drug Product, and Delivery: Considerations for Fc-Fusion Proteins. In Therapeutic Fc-Fusion Proteins* (eds S. M. Chamow, T. Ryll, H. B. Lowman and D. Farson), 2013).

In the stability studies, such as other Fc fusion proteins, hy-Fc fused G-CSF also presented lower stability for several conditions, in comparison to recombinant antibodies present as nonfused form. In addition, hy-Fc fused G-CSF structure is different than the structure of other regular Fc hybrids. In particular, other regular Fc platforms often include IgG2 or similar immunoglubulins' Fc region and the drug is directly fused to this single immunoglubulin's Fc region. However, hy-Fc platform (EP20080766022, U.S. Pat. No. 8,586, 038B2) is a combination of IgD and IgG subclasses, where the immunoglobulin Fc part itself forms a fusion and the fusion of the drug to this immunoglobulin part makes up the second fusion. In this respect, the originator unique molecule hy-Fc-G-CSF requires attention to the stability of both the Fc fusion part and the G-CSF part and thus additional different and unique solutions for preserving its stability are needed. In this frame, although the appropriate conditions could be determined (PCT/TR2018/050208) for a liquid formulation of hy-Fc fused G-CSF, a second formulation form, namely lyophilized form, was also decided to be sought in order to obtain improved shelf life and easier worldwide storage and distribution of the product.

DESCRIPTION OF THE INVENTION

The main object of the present invention is to provide a stable lyophilized pharmaceutical formulation prepared by lyophilizing an aqueous preparation comprising therapeutically effective amount of hybrid Fc fused Granulocyte Colony Stimulating Factor (G-CSF); at least one stabilizer; at least one surfactant; and a buffer system wherein the pH value of the preparation is between 3.8 and 5.2, preferably between 4 and 5, more preferably 4.0 and 5.0.

The main object of the present invention is to provide a stable lyophilized pharmaceutical formulation prepared by lyophilizing an aqueous preparation comprising at least 10 mg/mL hybrid Fc fused Granulocyte Colony Stimulating Factor (G-CSF); at least one stabilizer; at least one surfactant; and a buffer system wherein the pH value of the preparation is between 3.8 and 5.2, preferably between 4 and 5, more preferably 4.0 and 5.0.

The present invention is to provide a stable lyophilized pharmaceutical formulation prepared by lyophilizing an aqueous preparation comprising at least 10 mg/mL hybrid Fc fused Granulocyte Colony Stimulating Factor (G-CSF); and at least one stabilizer which is selected from the group consisting of glucose, trehalose, sucrose or sugar alcohols such as mannitol, sorbitol, and xylitol or combinations thereof; wherein the pH value of the preparation is between 3.8 and 5.2, preferably between 4 and 5, more preferably 4.0 and 5.0.

The present invention is to provide a stable lyophilized pharmaceutical formulation prepared by lyophilizing an aqueous preparation comprising at least 10 mg/mL hybrid Fc fused G-CSF; at least one stabilizer selected from the group consisting of glucose, trehalose, sucrose or sugar alcohols such as mannitol, sorbitol, and xylitol or combinations thereof; poloxamer-based non-ionic surfactant as a surfactant; and a buffer system wherein the pH value of the preparation is between 3.8 and 5.2, preferably between 4 and 5, more preferably 4.0 and 5.0.

The present invention is to provide a stable lyophilized pharmaceutical formulation prepared by lyophilizing an aqueous preparation comprising at least 10 mg/mL hybrid Fc fused G-CSF; combination of trehalose and sorbitol as stabilizer; poloxamer-based non-ionic surfactant as a surfactant; acetate buffer as a buffer system; wherein the pH value of the preparation is between 3.8 and 5.2, preferably between 4 and 5, more preferably 4.0 and 5.0.

The present invention is to provide a stable lyophilized pharmaceutical composition prepared by lyophilizing an aqueous preparation of hybrid Fc fused G-CSF with a concentration between 10 mg/mL and 80 mg/mL, preferably 20 mg/mL and 40 mg/mL; comprising a combination of trehalose and sorbitol as stabilizer with a weight ratio of trehalose to sorbitol is between 2:1 to 4:1 and total concentration of stabilizer is between 6.5% (w/v) and 9.5% (w/v); poloxamer-based non-ionic surfactant as a surfactant with at a concentration between 0.08% (w/v) and 0.15% (w/v) based on the total volume of the formulation; acetate buffer is used as a buffer system; wherein the pH value of the preparation is between 3.8 and 5.2, preferably between 4 and 5, more preferably 4.0 and 5.0.

It is therefore the focus of the present invention to provide a lyophilized composition comprising long-acting G-CSF molecules fused via peptide link to a hybrid-Fc (hy-Fc), monoclonal antibody-like platform. The invented formulation prepared by lyophilizing an aqueous preparation for recombinant human G-CSF-hyFc should have especially suitable pH, stabilizers and surfactant that enable lyophilization of hy-Fc fused G-CSF and high stability.

BRIEF DESCRIPTION OF THE DRAWINGS

FIG. 2 shows the sequence of the signal, N-terminak, G-CSF, and hy-Fc of the hy-Fc fused G-CSF according to an embodiment.

Figure 1:
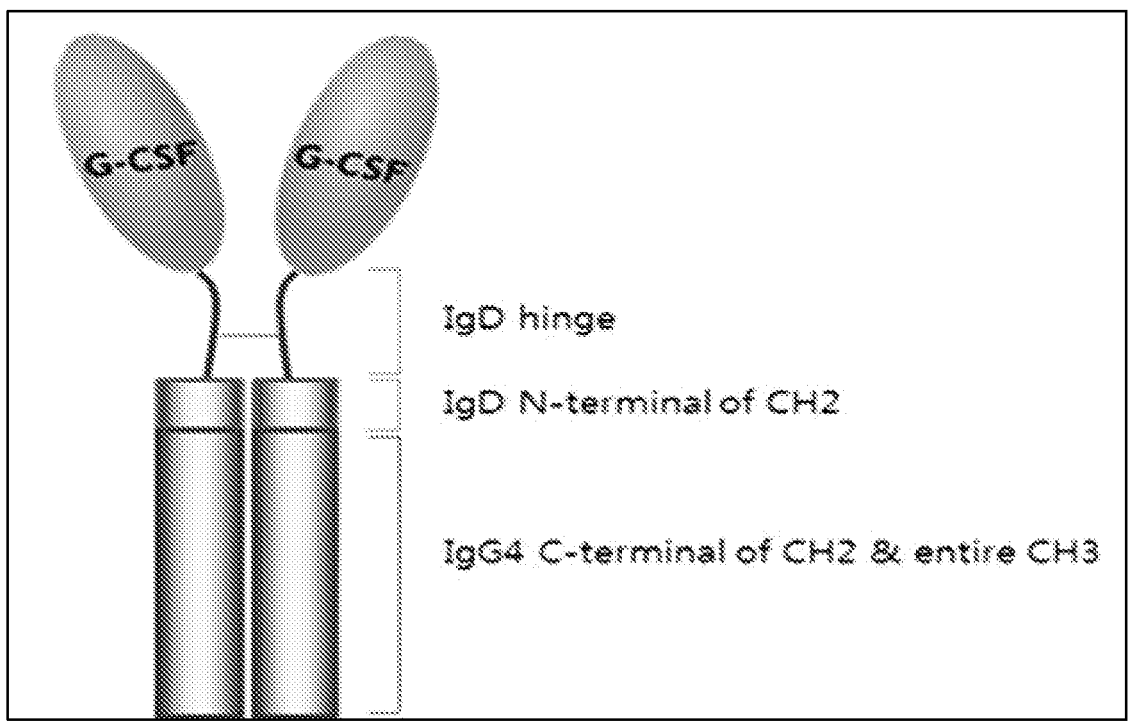
FIG. 1 depicts a schematic protein structure of hy-Fc fused G-CSF according to an embodiment.

A "stable" formulation or drug product is one in which the hy-Fc fused G-CSF molecule therein essentially retains its biophysical and chemical stability and integrity during lyophilization process and storage. Stability of the hy-Fc fused G-CSF molecule formulations can be measured after reconstitution of lyophilized formulation and its exposure to different temperatures for different durations. Change in purity, biophysical properties and efficacy of Fc-fused G-CSF molecule is the main indicator of stability, thus should be monitored at chosen temperatures in defined time intervals. In one embodiment, the stable lyophilized formulation of hy-Fc fused G-CSF may maintain more than about 95% of the hy-Fc fused G-CSF after storage at 2-8° C., 25° C.-60% RH, 30° C.-65% RH and 40° C.-75% RH for 3 months.

The term 'preparation' refers to prepared aqueous formulation prior to lyophilization. The preparation which comprises therapeutically effective amount of hybrid Fc fused G-CSF, at least one stabilizer, at least one surfactant and a buffer system used for adjusting the pH of the solution was then lyophilized to produce lyophilized pharmaceutical composition of hybrid Fc fused G-CSF.

The term "therapeutically effective amount" refers to an amount which, when administered to a living subject, achieves a desired effect on the living subject. Typically, the therapeutically effective amount of G-CSF (Neulaste EMA document) is 6 mg per single-use. To provide same therapeutic effect the concentration of the stable form of hybrid Fc fused G-CSF used in the present invention is at least 10 mg/mL, especially on the order of 10 mg/mL to 80 mg/mL, and preferably on the order of 20 mg/mL to 40 mg/mL.

The term "buffer system" refers to one or more components that when added to an aqueous solution is able to protect the solution against variations in pH when adding acid or alkali, or upon dilution with a solvent. Thus, buffer solution plays an important role to stabilize hy-Fc-G-CSF before the lyophilization and after the reconstitution. There can be used a buffer system selected from the group consisting of citrate, citro-phosphate, alanine, glycine, arginine, acetate, succinate, histidine either alone or a combination thereof. In this invention, the buffer system comprising sodium acetate and acetic acid/sodium hydroxide is selected. In particular, sodium acetate trihydrate can be used.

A "stabilizer" promotes stability of polypeptide components, thereby maintaining their therapeutic effectiveness during lyophilization process and storage. In the present invention sugars such as glucose, trehalose, sucrose or sugar alcohols such as mannitol, sorbitol, and xylitol may also be included in the formulation. Based on the total volume of reconstituted formulation, the sugar or sugar alcohol concentration is preferably between about 1.0% (w/v) and about 15.0% (w/v). In this invention, the stabilizers are trehalose and sorbitol combination wherein weight ratio of trehalose to sorbitol is between 2:1 and 4:1 and concentration of total stabilizer is between 6.5% (w/v) and 9.5% (w/v). A trehalose hydrate can be used. As trehalose hydrate, trehalose dihydrate can be exemplified.

A "surfactant" is a surface active molecule containing both a hydrophobic portion (e.g., alkyl chain) and a hydrophilic portion (e.g., carboxyl and carboxylate groups). For prevent surface denaturation and aggregation during lyophilization, non-ionic surfactants are commonly used in protein formulations (Cao, W. et al, *Formulation, Drug Product, and Delivery: Considerations for Fc-Fusion Proteins. In Therapeutic Fc-Fusion Proteins* (eds S. M. Chamow, T. Ryll, H. B. Lowman and D. Farson), 2013). In the present invention a poloxamer-based non-ionic surfactant is used at a concentration between 0.08% (w/v) and 0.15% (w/v) based on the total volume of the formulation.

All inventions explained herein, are completely specific to the described hy-Fc-G-CSF drug and have been developed per the specific needs for the stability of this unique originator molecule (U.S. Pat. No. 8,586,048 B2). The present invention differs from the prior art, with being a 'third generation G-CSF' protein, namely hybrid Fc fusion G-CSF (hy-Fc-G-CSF).

hy-Fc-G-CSF structure differs from both earlier G-CSF (filgrastim and peg-filgrastim) molecules and other Fc fusion proteins and monoclonal antibodies (mAb or MoAb). Regarding its different structure, it requires different solutions for providing its stability via proper formulation. Firstly, hy-Fc-G-CSF contains two unnatural conjunction sites between IgD, IgG and G-CSF, unlike mAbs or regular Fc hybrids. hy-Fc-G-CSF conjuction sites stand as novel susceptible sites for causing instability of the molecule. Thus, mAb or regular Fc specific formulation solutions do not provide suitable answers for setting up hy-Fc-G-CSF formulation.

Secondly, as hy-Fc-G-CSF is a hybrid of the aforesaid three different parts, all of them need to be separately supported for their own stability. One has to pay attention to both stability of the Fc part coming from IgG and IgD and stability of the G-CSF part separately. These different parts require different conditions to be stable, which creates a more difficult problem to be solved. One example would be suitability of a very narrow range of pH, as given in the submitted application.

Thirdly, regular Fc fusions and hy-Fc-G-CSF differ in one more respect. Regular Fc fusions are produced at two steps and contain at least one cross-linking chemical agent. At the first step, Fc and active molecule are produced genetically but separately from two separate genetic codes. Then, at the second step, two parts are conjugated chemically using the cross-linking agent. On the contrary, hy-Fc-G-CSF is directly produced at one single genetic manufacturing step using one single theoretically fused genetic code. More importantly, it does not have neither any non-protein entity, nor any chemical cross-linking agent in its structure, such as regular Fc fusion proteins have. These important structural differences between hy-Fc-G-CSF and regular Fc fusions create the need of different stabilizing conditions.

Overall, as hy-Fc-G-CSF is structurally completely different form other G-CSFs, mAbs or regular Fc hybrids, a completely different approach is required to develop its formulation suitable for this different structure's stability.

Differences from other G-CSF molecules are explained as:

First generation G-CSF: Filgrastim (Neupogen®) consists of only bacterial G-CSF without any modifications, which causes its faster clearance from the serum. Neupogen's sole G-CSF structure is much smaller and easier to be formulated compared to hy-Fc-G-CSF.

Second generation G-CSF: Pegfilgrastim (NEULASTA®) contains pegylated G-CSF and thus has comparably an increased half-life. On the contrary, it is known that PEG could have some adverse effects and Pegylation brings an additional production step. Structurally having PEG or hy-Fc attached to G-CSF, again creates very different structures.

Third generation G-CSF: Hybrid Fc fusion G-CSF (Hy-Fc-G-CSF), the molecule used in this invention, is third generation G-CSF as being a hybrid of 3 separate molecular entities, namely, IgD, IgG and G-CSF, composed together through genetic engineering. Both, IgD and IgG fusion and G-CSF couplings are accomplished through transcription and translation of one single genetic code composed of the genetic codes of these three structures. The formula for the genetic code was earlier patented through U.S. Pat. No. 8,586,048 B2 patent. It is more difficult to stabilize this higher molecular weight structure, compared to both Filgrastim and Pegfilgrastim. Thus, different conditions and combinations are required to develop the formulation for hy-Fc-G-CSF.

Differences from other Fc hybrids contain one single Fc domain from one single Ig molecule. In such structures, "hybrid" stands for the coupling of Fc of an Ig with an active ingredient. However, the Fc part of Hy-Fc-G-CSF structure, called hybrid Fc, is formed by two different Ig molecules, namely IgD and IgG. G-CSF is coupled to this hybrid Fc structure. Thus, for hy-Fc-G-CSF, "hybrid" stands for two different couplings, where first one is coupling of IgD and IgG to form hy-Fc platform and second one is coupling of G-CSF to this hy-Fc platform.

Secondly, unlike other regular Fc hybrids which contain cross-linking agents to fuse Fc with active molecules, hy-Fc-G-CSF does not have any cross-linking agent. The fusion of regular Fc fusion drugs, are accomplished by producing Fc and active molecule separately and doing a chemical post-production fusion as a second step. However, hy-Fc-G-CSF fusion is carried out genetically, by transcription and translation of the single genetic code and no cross-linking agent is used in the structure. This genetic code is previously theoretically produced and patented through the mentioned U.S. Pat. No. 8,586,048 B2 patent.

As firstly given at U.S. Pat. No. 8,586,048 B2 patent, the hybrid Fc fusion G-CSF (hy-Fc-G-CSF) is represented by the following formula (I):

N'-G-Y-Z2-Z3-Z4-C'     Formula (I)

wherein

G is a G-CSF;

N' is the N-terminal of a polypeptide and C' is the C-terminal of a polypeptide; and Y-Z2-Z3-Z4 represents hy-Fc.

In this respect, hyFc fused G-CSF is a unique and originator molecule, where the Fc part itself is a fusion of two immunoglobulin molecules and this first fusion is further fused to the active molecule.

For use in the present invention, the hy-Fc platform and G-CSF have amino acid sequence of humanized organisms. No additional fusion reaction is used, as the fusions both between the IgD and IgG and between G-CSF and the immunoglobulin part are provided through single genetic code and single transcription-translation 25 reaction. The peptide bond between G-CSF and hy-Fc platform is through Proline-Arginine. Amino acid sequence of hy-Fc fused G-CSF monomer is set forth in SEQ ID NO: 1 and provided below. FIG. 2 shows the sequences of the signal, N-terminal, G-CSF, and hy-Fc sequences. Schematic protein structure of hy-Fc fused G-CSF is shown in FIG. 1. Hybrid Fc used for G-CSF coupling is derived from the combination of parts of human IgD and 30 IgG. In this structure (FIG. 1) (i) the part of the human IgD (IgD hinge and N-terminal of CH2) that creates no ADCC response was used to eliminate cytotoxicity, and (ii) for IgG4, the part which also eliminates cytotoxicity for not creating any CDC response was used. The very same part has strong binding capacity to FcRn, thus provides long half-life via cycling of the molecule through FcRn binding and has 21 day long cycling 35 period in the human serum.

(SEQ ID NO: 1)
MAGPATQSPMKLMALQLLLWHSALWTVQEA*TPLGP*ASSLPQSFLLKCLE

QVRKIQGDGAALQEKLCATYKLCHPEELVLLGHSLGIPWAPLSSCPSQA

LQLAGCLSQLHSGLFLYQGLLQALEGISPELGPTLDTLQLDVADFATTI

WQQMEELGMAPALQPTQGAMPAFASAFQRRAGGVLVASHLQSFLEVSYR

VLRHLAQP<u>RNTGRGGEEKKKEKEKEEQEERETKTPECPSHTQPLGVFLF</u>

<u>PPKPKDILMISRTPEVTQWVDVSQEDPEVQFNWYVDGVEVHNAKTKPRE</u>

<u>EQFNSTYRVVSVLTVLHQDWLNGKEYKCKVSNKGLPSSIEKTISKAKGQ</u>

<u>PREPQVYTLPPSQEEMTKNQVSLTCLVKGFYPSDIAVEWESNGQPENNY</u>

<u>KTTPPVLDSDGSFFLYSRLTVDKSRWQEGNVFSCSVMHEALHNHYTQKS</u>

<u>LSLSLGK</u>

Overall, the hybrid Fc is effective, when joined to a biologically active molecule, to increase serum half-life of the biologically active molecule as well as increase expression level of the polypeptide when a nucleotide coding for the Fc-polypeptide fusion protein is expressed. Thus, Hybrid Fc (hyFc)-Fused G-CSF also has a longer plasma half-life, efficient expression level, eliminated cytotoxicity and reduced immunogenicity (U.S. Pat. No. 8,586,048 B2).

In this invention it is found that, the stability of the molecule is mostly affected by and prone to hydrolysis at lower pH values (pH<5.0) at the G-CSF junction site and di-sulfide shuffling at high pH values (pH>6.5). G-CSF has two disulphide bonds formed by homologous cysteine residues and an extra cysteine residue at position at 17, which cannot participate in intramolecular disulfide bonds. The disulphide bonds in these molecules stabilize the structures and make them resistant to relatively harsh treatment (some proteases, high temperatures, denaturing solvents, extreme pH), which do lead to denaturation after reduction of disulfide bonds (Nicos A. Nicola, *The waiter and Eliza Hall Institute of Medical Research, "Granulocyte Colony Stimulating Factor"*, p. 77-100).

Additionally, in-house studies demonstrated that hy-Fc fused G-CSF is no or hardly soluble between pH 5.3 and 6.0 and it is known that G-CSF itself is stable and active at around pH 4.0 (T. Arakawa, S. J. Prestrelski, L. O. Narhi, T. C. Boone, W. C. Kenney, *Cysteine 17 of recombinant human granulocyte-colony stimulating factor is partially solvent-exposed, J. Protein Chem.* 12 (1993) 525-531).

Methods for Selecting Ideal Fc Fused G-CSF Formulations of Invention:

The pH of the aqueous preparation prior to lyophilization and aqueous pharmaceutical composition obtained by reconstitution of lyophilized dry powder may be determined by the potentiometric analysis described in the USP <791>.

Sodium Dodecyl Sulfate Polyacrylamide Gel Electrophoresis (SDS-PAGE) analysis may be performed for hy-Fc fused G-CSF to compare the molecular weight with the one of in-house reference standard. The drug product and the in-house reference standard is diluted to 500 µg/mL using deionized water, and is made to 3 µg/20 µL using NuPAGE® LDS sample buffer (4×) and deionized water. It is loaded on the NuPAGE® Novex 4-12% Bis-tris gel (1.0 mm, 10 well) for electrophoresis. Isoelectric focusing gel electrophoresis may be used to identify hy-Fc fused G-CSF's isoelectric point range to the in-house reference standard. The drug product and the in-house reference standard are diluted to 1 mg/mL using deionized water, and made to 10 µg/20 uL using Novex® IEF sample buffer 2×). Isoelectric focusing is carried out using Novex® pH 3-10 IEF gel 1.0 mm, 10 well.

Purity of hy-Fc fused G-CSF in terms of monomeric and hydrophobic properties may be separated and monitored with liquid chromatographic techniques.

Size Exclusion Chromatography (SE-HPLC) may be the preferred method to separate molecules based on their size hence the high molecular weight species (HMW) and degraded species by using Acquity Arc (Waters). Separation is achieved by the differential molecular exclusion or inclusion as the molecules migrate along the length of the column. The drug substance is diluted to 1 mg/mL and separated using the TSK-GEL G3000SWxL (7.8*300 mm) column and TSK-GEL G3000SWxL (6*40 mm) (TOSOH Bioscience) guard column. Mobile phase is composed of 50 mM phosphate buffer: sodium phosphate dibasic 5.34 g, sodium phosphate monobasic 3.12 g, sodium chloride 8.76 g in 1 L deionized water which are mixed with acetonitrile in 9:1 (v/v) ratio, where the final pH is 7.0. Flow rate 0.5 mL/min and detection wavelength of 214 nm are applied for 30 min. The % area of main peak to total area according to analysis result is calculated wherein the output indicates the monomeric purity.

Reverse Phase-High Performance Chromatography (RP-HPLC) may be another method to check purity via separating them by means of hydrophobicity. RP-HPLC is used to check impurities and retention time of Fc-fused G-CSF variants and truncated forms by using Acquity Arc (Waters) A concentration of 1 mg/mL of drug in corresponding formulation buffer is separated by using the Vydac 214TP C4 column (4.6*250 mm) (Grace, Vydac) column and guard column 214MS C4, 5 µm, 7.5×4.6 mm (Grace, Vydac). Mobile phase is composed of 0.15% trifluoroacetic acid (TFA) in deionized water and 0.15% TFA in Acetonitrile, at a flow rate of 0.5 mL/min. Detection wavelength of 220 nm is applied for 35 minutes and the % area of main peak to total area according to analysis result is monitored.

Residual moisture of the lyophilized products is determined by the Karl-Fisher method described in the USP <921>.

Visible particles of the lyophilized products are determined by naked eye. As indicated in the USP, aqueous injections should be "substantially free" of particles discernable with the naked eye.

The invention was described in the following examples including lyophilized formulation of full length hyFc-Fused G-CSF described in U.S. Pat. No. 8,586,048 B2.

Preliminary Studies:

Determination of Proper Stabilizer and Buffer System

In formulations of Fc-fusion proteins, low-pH formulations can encounter proteolysis and deamidation, whereas high-pH formulations often experience aggregation, oxidation, and disulfide scrambling. (Cao, W., Piedmonte, D. M., Ricci, M. S., & Yeh, P. Y. (2013). *Formulation, Drug Product, and Delivery: Considerations for Fc-Fusion Proteins. Therapeutic Fc-Fusion Proteins*, 115-154.) According to this information, the preliminary studies were started at low pH, around pH 4.0.

In the preliminary studies, at the beginning, seven different aqueous preparations having hy-Fc fused G-CSF as active ingredient, poloxamer 188 as surfactant in acetate buffer having about pH 4.0 were prepared with using different stabilizing agents. These prepared aqueous preparations were lyophilized. After the lyophilization process, the compositions were analyzed for cake appearance, reconstitution time and pH (pH was measured with reconstituted aqueous compositions). Cake appearance is an important attribute of freeze-dried products which may change the quality of product (primarily residual moisture, reconstitution time, stability, and potency) that may subsequently affect patient safety and product efficacy. Reconstitution time is the time that is required to rehydrate a lyophilized formulation with a solution to a particle-free clarified solution. In the present invention, the lyophilized formulations were reconstituted with 1 mL injectable water.

TABLE 1

Preliminary Studies for the Determination of Proper Stabilizer

| Formulation | Component | Stabilizer | After lyophilization process | | |
|---|---|---|---|---|---|
| | | | Cake appearance | Reconstitution time | pH |
| Form-1 | 0.4% hyFc-fused G-CSF 0.1% Poloxamer 188 Sodium acetate trihydrate | 4% Sorbitol | Fail | Fail | — |
| Form-2 | | 4% Sorbitol + 2% Sucrose | Fail | Fail | — |
| Form-3 | | 4% Sorbitol + 2% Sucrose + 4% Mannitol | Fail | Fail | — |
| Form-4 | | 4% Sorbitol + 4% Mannitol | Fail | Acceptable | 4.12 |
| Form-5 | Acetic acid/ Sodium hydroxide | 4% Mannitol | Acceptable | Acceptable (Aggregation occurs*) | 5.48 |
| Form-6 | Water | 4% Mannitol + 1% Sucrose | Acceptable | Acceptable | 4.73 |
| Form-7 | | 4% Mannitol + 2% Sucrose | Acceptable | Acceptable | 4.72 |

*Discernable with the naked eye

According to cake appearance and reconstitution time results, Formulations 1-4 were not acceptable for lyophilization product. Also, Form-5 showed significant increase of aggregation discernable with the naked eye after reconstituted with 1 mL injectable water. This results could be explained by pH shifting over 5.2 in the formulation during lyophilization (pI of hyFc-Fused G-CSF is found no or hardly soluble between pH 5.3-6.0) because of acetic acid evaporation. Also increased pH was observed in Form-6 and 7. pH shifts were limited in sucrose containing formulation rather than only mannitol containing solution. According to these preliminary results, these were demonstrated:

Acceptable cakes were not obtained with 4% sorbitol containing products,

Acetic acid could be cause pH shift during the lyophilisation and this could be vital for formulation stability, The presence of sucrose in the formulation could improve stability.

After these studies, different buffer systems were used in same formulations as given below. Citrate buffer system was used in order to prevent pH shift of the lyophilized product. Form-8 was prepared with citrate buffer system at pH 4.2 comprising 2.0% hy-Fc fused G-CSF as active ingredient, poloxamer 188 as surfactant, 4% mannitol and 1% sucrose as stabilizer. Form-9 was prepared with acetate buffer system at pH 4.2 comprising 2.0% hy-Fc fused G-CSF as active ingredient, poloxamer 188 as surfactant, 4% mannitol and 1% sucrose as stabilizer. These aqueous preparations were stayed for 1 week at 25° C. before lyophilization in order to show the stability of hy-Fc fused G-CSF with different buffer systems.

TABLE 2

Preliminary Studies for the Determination of Proper Buffer System

| | | | Concentration of hy-Fc fused G-CSF (%) | |
|---|---|---|---|---|
| Formulation | Stabilizer | Buffer System | To | 1 week later at 25° C. |
| Form-8 | 4% mannitol + 1% sucrose | 100 mM Citrate buffer pH 4.2. | 99.8 | 53.2 |
| Form-9 | 4% mannitol + 1% sucrose | 10 mM Acetate buffer pH 4.2 | 99.6 | 80.6 |

In Form-8, visible aggregation was formed at aqueous preparations after 1 week. The aggregation was also showed by the nearly 50% decrease of concentration at Form-8 and nearly 20% decrease of concentration at Form-9 at Table 2. These aqueous preparations were not lyophilized because of the instability in the aqueous forms. Therefore, it is concluded that hy-Fc fused G-CSF is more stable in acetate buffer and development studies of formulation was continued with acetate buffer.

Trehalose and sucrose were considered to be of priority in order to test different stabilizing agents. Although stability improving potential of sucrose was demonstrated, hydrolyses of sucrose could be a problem in acid medium. Since sucrose was hydrolysed in acidic medium, trehalose was decided to be used in the next studies.

Before starting the formulations, a pre-study of aqueous preparations comprising poloxamer 188 as surfactant in acetate buffer at pH 4.25 without hy-Fc fused G-CSF were prepared with different combinations of trehalose and sorbitol to evaluate cake structures and pH shifts.

TABLE 3

Determination of Proper Stabilizer Percent without hy-Fc fused G-CSF protein

| | | Before | After Lyophilization | |
|---|---|---|---|---|
| Formulations* | Stabilizer (w/v) | Lyophilization pH** | Cake Appearance | pH** |
| Form-10 | 1.5% sorbitol: 7.0% trehalose* | 4.25 | Acceptable | 4.55 |
| Form-11 | 2.0% sorbitol: 5.5% trehalose* | 4.26 | Acceptable | 4.35 |
| Form-12 | 2.5% sorbitol: 5.5% trehalose* | 4.26 | Acceptable | 4.48 |
| Form-13 | 3.0% sorbitol: 3.0% trehalose* | 4.25 | Fail | 4.68 |
| Form-14 | 4.0% sorbitol: 1.0% trehalose* | 4.25 | Fail | 4.98 |
| Form-15 | 5.0% sorbitol | 4.28 | Fail | 5.16 |

*Trehalose dehydrate was used as trehalose.
**Formulations were prepared using 1 mL injectable water and lyophilized formulation was reconstituted with 1 mL injectable water.

According to results at Table 3, acceptable cakes were obtained with decreased sorbitol and increased trehalose amounts. Additionally decreasing of trehalose percent in formulations was caused increased-pH shift. As conclusion, 2% was selected as limit for sorbitol content in formulation to obtain acceptable cake structure.

In the preliminary studies, different stabilizers and buffer systems were tried out to find proper excipients. The stable lyophilization formulation comprising the unique originator molecule hy-Fc-G-CSF is completely specific and quite difficult. This is the first lyophilization study comprising hy-Fc-G-CSF and assuring the stability of this unique drug product comprising the Fc fusion part and the G-CSF part together. Therefore, in the next examples the aqueous preparations will be prepared with hy-Fc fused G-CSF as active ingredient, poloxamer 188 as surfactant, a combination of trehalose and sorbitol as stabilizer in acetate buffer.

Example 1: Determination of Composition for by Fc-Fused G-CSF Formulations

In-house studies showed that the isoelectric point (pI) of hyFc-Fused G-CSF is between 5.3 and 6.9. In this range, hyFc-Fused G-CSF have limited solubility. Moreover it is observed that colloidal stability of hyFc-Fused G-CSF is increased with decreasing pH (5.2 to 3.8) (PCT Patent Application PCT/TR2018/050208). Therefore, according to in-house studies ideal pH range for this composition was specified as between 3.8 and 5.2, preferably between 4 and 5, more preferably between 4.0 and 5.0.

After determination of pH range, sorbitol and trehalose combination was selected as stabilizer; poloxamer 188 was selected as surfactant. Based on these selections, a formulation was determined for lyophilization as shown below (Table 4).

TABLE 4

Determined Composition of hy Fc-Fused G-CSF formulation

| Component | Function | Percent Quantity** % (w/v) |
|---|---|---|
| hy-Fc fused G-CSF | Active ingredient | 2.0 |
| Sorbitol | Stabilizer | 1.5-2.5 |
| Trehalose dihydrate | Stabilizer/Bulking Agent | 5.0-7.0 |
| Poloxamer 188 (Pluronic F68) | Surfactant | 0.08-0.15 |
| Sodium Acetate Trihydrate | Buffering agent | 0.016 |
| Acetic acid/ Sodium hydroxide | Buffering agent | q.s. |
| Water | Solvent | * |

* Formulations were prepared using 1 mL injectable water and lyophilized formulation was reconstituted with 1 mL injectable water.
q.s.: Quantity required Example 2: Short-Term Liquid Stability and Evaluation of Freeze-Thaw Effects of the Determined Formulation To determine feasibility of determined formulation for freeze-drying, a short-term liquid stability and effect of freeze-thaw were evaluated for the formulation given at Table 5.

TABLE 5

Composition of hy Fc-Fused G-CSF formulation

| Component | Function | Quantity |
|---|---|---|
| hy-Fc fused G-CSF | Active ingredient | 20 mg |
| Sorbitol | Stabilizer | 20 mg |
| Trehalose dihydrate | Stabilizer/Bulking Agent | 55.26 |
| Poloxamer 188 (Pluronic F68) | Surfactant | 1 mg |
| Sodium Acetate Trihydrate | Buffering agent | 0.16 mg |
| Acetic acid/ Sodium hydroxide | Buffering agent | q.s. |
| Water | Solvent | 1 mL | q.s.: Quantity required

G-CSF formulation was prepared in formulation composition given above (Table 5) by dissolving the excipients in water for injection. The protein concentration was set to 20 mg/mL and the pH of the formulation is set to pH 4.6.

To determine short-term liquid stability, formulation was incubated at 25° C. for 1 week. After 1 week, stability of hyFc-Fused G-CSF was evaluated by SE-HPLC, RP-HPLC, SDS-PAGE, and IEF analyses. On the other hand, freeze-thaw effects were evaluated by SE-HPLC analyses after 3 freeze-thaw cycles (−80° C. and 25° C.).

TABLE 6

Short-term liquid stability of hyFc-Fused G-CSF formulation
and evaluation of freeze-thaw effect on this formulation

| TESTS | ACCEPTANCE CRITERIA | t = 0 | After 1 week at 25° C. | After freeze-thaw 1 | After freeze-thaw 2 | After freeze-thaw 3 |
|---|---|---|---|---|---|---|
| pH | N/A | 4.6 | 4.5 | — | — | — |
| SDS-PAGE (Identity) | Main band corresponds to the reference standard | Similar to standard, Main band (~98 kDa) | Similar to standard, Main band (~98 kDa) | Similar to standard, Main band (~98 kDa) | — | — |
| IEF (Identity) | Main band corresponds to the reference standard (pI 5.3~6.9) | Similar to standard, Main band (pI 5.3~6.9) | Similar to standard, Main band (pI 5.3~6.9) | Similar to standard, Main band (pI 5.3~6.9) | — | — |
| SE-HPLC (Purity) | ≥93% | 99.5 | 99.5 | 99.5 | 99.5 | 99.4 |
| RP-HPLC (Purity) | ≥90% | 96.3 | 95.0 | 95.1 | — | — |

According to results given at Table 6, after a week at 25° C., SE-HPLC, RP-HPLC, SDS-PAGE and IEF results were found similar. Also SE-HPLC purity was determined similar after 3 freeze-thaw cycle. These results demonstrated that this formulation could be stable in lyophilization process at expected pH range.

Example 3: Lyophilization of Hybrid Fc Fused G-CSF Formulation at pH 4.8 (LF4.8)

For the lyophilization of hyFc-Fused G-CSF formulation (Table 5), formulation was prepared at pH 4.8 and coded as LF4.8. Then the product was filled into 2R type 1 glass vials and partially stoppered with lyophilization stoppers. Lyophilization cycles were performed in Lyobeta freeze dryer (Telstar, Spain). Lyophilization cycle was performed with an initial hold step at 5° C., frozen hold step at −50° C., primary drying step at −40° C., 0.07 mBar for 48 h and secondary drying at 35° C. for 7 h.

Before and after lyophilization, stability of hyFc-Fused G-CSF was evaluated by SDS-PAGE, IEF, SE-HPLC, RP-HPLC and visible particles analyses. After lyophilization, residual moisture was determined by Karl-Fisher analysis. pH of formulation was measured before the lyophilization process and after the reconstitution of lyophilized formulation. Results are shown in Table 7 below.

TABLE 7

Analysis results of hy-Fc Fused G-CSF formulation
at pH 4.8 (LF4.8) before and after lyophilization

| | | LF4.8 | |
|---|---|---|---|
| Tests | Acceptance Criteria | Before Lyophilization | After Lyophilization |
| pH* | N/A | 4.8 | 4.9 |
| SDS-PAGE (Identity) | Main band corresponds to the reference standard | Similar to standard, Main band (~98 kDa) | Similar to standard, Main band (~98 kDa) |
| IEF (Identity) | Main band corresponds to the reference standard (pI 5.3~6.9) | Similar to standard, Main band (pI 5.3~6.9) | Similar to standard, Main band (pI 5.3~6.9) |
| SE-HPLC (Purity) | ≥93% | 99.4 | 99.4 |
| RP-HPLC (Purity) | ≥90% | 96.4 | 96.4 |
| Residual Moisture | <3% | NA | 1.3 |
| Visible Particles | Substantially free | pass | pass |

*Lyophilized formulation was reconstituted with 1 mL injectable water.

After the lyophilization process pharmaceutically acceptable cakes were obtained (white and intact) (Patel, S. M., et al. *Lyophilized Drug Product Cake Appearance: What Is Acceptable?*, Journal of Pharmaceutical Sciences, Volume 106, Issue 7, Pages 1706-1721, 2017). SE-HPLC purity and RP-HPLC purity were found similar at pre- and post-lyophilization. After lyophilization, a small pH shift, pH 4.8 to pH 4.9, was observed.

Also, SDS-PAGE and IEF results were found similar. Consequently, the structure of hy-Fc Fused G-CSF was preserved in the determined formulation at pH 4.8 during lyophilization process.

Example 4: Accelerated Stability Studies of Lyophilized Hy-Fc Fused G-CSF Formulation (LF4.8)

The lyophilized formulation of hy-Fc Fused G-CSF (LF4.8), given at Example 3, was subjected to accelerated stability studies under 25° C. with 60% relative humidity (RH) and 40° C. with 75% RH for 1 week and 2 weeks to foresee the potential stability of the protein over its shelf-life. Results are shown in Table 8 and Table 9 below.

TABLE 8

Analysis results of lyophilized hy-Fc Fused G-CSF formulation after 1 week accelerated stability conditions

| After 1 week | Acceptance Criteria | 2-8° C. (as control) | 25° C.-60% RH | 40° C.-75% RH |
| --- | --- | --- | --- | --- |
| pH* | N/A | 5.1 | 5.0 | 4.9 |
| SDS-PAGE (Identity) | Main band corresponds to the reference standard | Similar to standard, Main band (~98 kDa) | Similar to standard, Main band (~98 kDa) | Similar to standard, Main band (~98 kDa) |
| IEF (Identity) | Main band corresponds to the reference standard (pI 5.3~6.9) | Similar to standard, Main band (pI 5.3~6.9) | Similar to standard, Main band (pI 5.3~6.9) | Similar to standard, Main band (pI 5.3~6.9). Faintly, basic variants were pronounced more than standard. |
| SE-HPLC (Purity) | ≥93% | 98.6 | 98.6 | 98.5 |
| RP-HPLC (Purity) | ≥90% | 97.3 | 98.5 | 96.4 |
| Residual Moisture | <3% | 1 | 0.8 | 1 |
| Visible Particles | Substantially free | pass | pass | pass |

*Lyophilized formulation was reconstituted with 1 mL injectable water.

TABLE 9

Analysis results of lyophilized hy-Fc Fused G-CSF formulation after 2 weeks accelerated stability conditions

| After 2 weeks | Acceptance Criteria | 2-8° C. (as control) | 25° C.-60% RH | 40° C.-75% RH |
| --- | --- | --- | --- | --- |
| pH* | N/A | 5.0 | 5.0 | 5.0 |
| SDS-PAGE (Identity) | Main band corresponds to the reference standard | Similar to standard, Main band (~98 kDa) | Similar to standard, Main band (~98 kDa) | Similar to standard, Main band (~98 kDa) |
| IEF (Identity) | Main band corresponds to the reference standard (pI 5.3~6.9) | Similar to standard, Main band (pI 5.3~6.9) | Similar to standard, Main band (pI 5.3~6.9) | Similar to standard, Main band (pI 5.3~6.9). Faintly, basic variants were pronounced more than standard. |
| SE-HPLC (Purity) | ≥93% | 98.3 | 98.4 | 98.2 |
| RP-HPLC (Purity) | ≥90% | 95.8 | 95.5 | 95.3 |
| Residual Moisture | <3% | 1.7 | 1.3 | 1.8 |
| Visible Particles | Substantially free | pass | pass | pass |

*Lyophilized formulation was reconstituted with 1 mL injectable water.

It was demonstrated that lyophilized hy-Fc Fused G-CSF formulation (LF4.8) was found to be stable at accelerated stability studies under 25° C. with 60% relative humidity (RH) and 40° C. with 75% RH for 1 week and 2 weeks.

Example 5: Lyophilization of Hybrid Fc Fused G-CSF Formulations at pH 4.2 (LF4.2) and pH 4.5 (LF4.5)

For the lyophilization of hyFc-Fused G-CSF formulations at pH 4.2 (LF4.2) and pH 4.5 (LF4.5), listed in Table 10, were prepared. Then the products were filled into 2R type 1 glass vials and partially stoppered with lyophilization stoppers. Lyophilization cycles were performed in Lyobeta freeze dryer (Telstar, Spain). Lyophilization cycle was performed with an initial hold step at 5° C., frozen hold step at −50° C., primary drying step at −40° C., 0.07 mBar for 48 h and secondary drying at 35° C. for 7 h.

TABLE 10

Composition of hy Fc-Fused G-CSF formulations at pH 4.2 (LF4.2) and pH 4.5 (LF4.5)

| Component | Function | Quantity |
|---|---|---|
| hy-Fc fused G-CSF | Active ingredient | 20 mg |
| Sorbitol | Stabilizer | 20 mg |
| Trehalose dihydrate | Stabilizer/Bulking Agent | 60.26 mg |
| Poloxamer 188 (Pluronic F68) | Surfactant | 1 mg |
| Sodium Acetate Trihydrate | Buffering agent | 0.16 mg |
| Acetic acid/Sodium hydroxide | Buffering agent | q.s. |
| Water | Solvent | 1 mL |

Before and after lyophilization, stability of hyFc-Fused G-CSF was evaluated by SDS-PAGE, IEF, SE-HPLC, RP-HPLC and visible particles analyses. After lyophilization, residual moisture was determined by Karl-Fisher analysis. Also, pH of formulations was measured before the lyophilization process and after the reconstitution of lyophilized formulations. Results are shown in Table 11 below.

TABLE 11

Analysis results of hy-Fc Fused G-CSF formulation at pH 4.2 (LF4.2) and pH 4.5 (LF4.5) before and after lyophilization

| | | LF4.2 | | LF4.5 | |
|---|---|---|---|---|---|
| Tests | Acceptance Criteria | Before Lyophilization | After Lyophilization | Before Lyophilization | After Lyophilization |
| pH* | N/A | 4.2 | 4.4 | 4.5 | 4.7 |
| SDS-PAGE (Identity) | Main band corresponds to the reference standard | Similar to standard, Main band (~98 kDa) | Similar to standard, Main band (~98 kDa) | Similar to standard, Main band (~98 kDa) | Similar to standard, Main band (~98 kDa) |
| IEF (Identity) | Main band corresponds to the reference standard (pI 5.3~6.9) | Similar to standard, Main band (pI 5.3~6.9) | Similar to standard, Main band (pI 5.3~6.9) | Similar to standard, Main band (pI 5.3~6.9) | Similar to standard, Main band (pI 5.3~6.9) |
| SE-HPLC (Purity) | ≥93% | 98.2 | 98.2 | 98.2 | 98.4 |
| RP-HPLC (Purity) | ≥90% | 96.3 | 96.4 | 96.3 | 96.4 |
| Residual Moisture | <3% | NA | 1.3 | NA | 1.4 |
| Visible Particles | Substantially free | pass | pass | pass | pass |

*Lyophilized formulation was reconstituted with 1 mL injectable water.

After the lyophilization process pharmaceutically acceptable cakes were obtained for all formulations (white and intact) (Patel, S. M., et al. *Lyophilized Drug Product Cake Appearance: What Is Acceptable?*, Journal of Pharmaceutical Sciences, Volume 106, Issue 7, Pages 1706-1721, 2017). SE-HPLC purity and RP-HPLC purity were found similar at pre- and post-lyophilization. After lyophilization, small pH shift was observed in both formulations. Also, SDS-PAGE and IEF results were found similar. Consequently, the structure of hy-Fc Fused G-CSF was preserved in the determined formulation at pH 4.2 and pH 4.5 during lyophilization process.

Example 6: Accelerated Stability Studies of Lyophilized Hy-Fc Fused G-CSF Formulations and Comparison with Liquid Formulation Lyophilized formulations (LF4.2, LF4.5, LF4.8) of hy-Fc Fused G-CSF, given in Example 3 and 5, were subjected to accelerated stability studies under 40° C. with 75% RH for 2 weeks to foresee the potential stability of the protein over its shelf-life. Results are shown in Table 12 below.

TABLE 12

Analysis results of lyophilized hy-Fc Fused G-CSF formulations after 2 weeks accelerated stability conditions (40° C.-75% RH)

| After 2 weeks at 40° C.-75% RH | Acceptance Criteria | Liquid Formulation* | LF4.2 | LF4.5 | LF4.8 |
|---|---|---|---|---|---|
| pH** | N/A | 4.4 | 4.5 | 4.7 | 5.0 |
| SE-HPLC (Purity) | ≥93% | 85 | 98.2 | 99.4 | 98.2 |
| RP-HPLC (Purity) | ≥90% | 86.1 | 96.3 | 96.3 | 95.3 |
| Residual Moisture | <3% | NA | 0.9 | 1 | 1.8 |
| Visible Particles | Substantially free | pass | pass | pass | pass |

*Liquid formulation consists of 20 mg/mL hy-Fc fused G-CSF, 10 mM Na/acetate buffer, 5% sorbitol, 0.1% poloxamer 188. This liquid formulation was found stable over 6 months at 2-8° C. (PCT Patent Application PCT/TR2018/050208).
**Lyophilized formulation was reconstituted with 1 mL injectable water.

It was demonstrated that lyophilized formulations (LF4.2, LF4.5, LF4.8) of hybrid Fc fusion G-CSF was found to be stable than liquid formulation which was found stable over 6 months at 2-8° C. (PCT Patent Application PCT/TR2018/050208). Consequently, these results revealed that stable lyophilized formulations were successfully developed for hybrid Fc fusion G-CSF. Herein, in the present invention, the Fc fused G-CSF lyophilized composition is comprised of a buffer system, at least one stabilizer, and at least one surfactant; wherein the preparation has pH value between 3.8 to 5.2, preferably 4 and 5, more preferably 4.0 to 5.0 and the stabilizer is the combination of trehalose and sorbitol.

Additionally, lyophilized formulation of LF4.2 of hy-Fc Fused G-CSF was subjected to different stability conditions (2-8° C., 25° C.-60% RH, 30° C.-65% RH and 40° C.-75% RH) for 3 months to foresee the potential stability of the protein over its shelf-life. Results are shown in Table 13 below.

TABLE 13

Analysis results of lyophilized hy-Fc Fused G-CSF formulations after 3 months at different stability conditions (2-8° C., 25° C.-60% RH, 30° C.-65% RH and 40° C.-75% RH)

| After 3 months | Acceptance Criteria | 2-8° C. | 25° C.-60% RH | 30° C.-65% RH | 40° C.-75% RH |
|---|---|---|---|---|---|
| | | | LF 4.2 | | |
| pH** | N/A | 4.4 | 4.4 | 4.4 | 4.5 |
| SE-HPLC (Purity) | ≥93% | 99.2 | 99.2 | 99.1 | 98.1 |
| RP-HPLC (Purity) | ≥90% | 96.4 | 96.3 | 95.1 | 95.6 |
| Residual Moisture | <3% | 0.9 | 1.1 | 1.2 | 1.4 |
| Visible Particles | Substantially free | pass | pass | pass | pass |

**Lyophilized formulation was reconstituted with 1 mL injectable water.

The results given at Table 13 were shown that the lyophilized composition prepared in this invention was showing good stability after 3 months at different stability conditions. The formulation developed in this present invention demonstrates the surprising technical effects on the stability conditions.

The present invention may comprise sorbitol as a stabilizer preferably at a concentration between 1.5% (w/v) and 2.5% (w/v) based on the total volume of the formulation before lyophilization and after reconstitution. The present invention may comprise trehalose as a stabilizer preferably at a concentration between 5.0% (w/v) and 7.0% (w/v) based on the total volume of the formulation before lyophilization and after reconstitution. In one embodiment, the stabilizers are a trehalose and sorbitol combination wherein weight ratio of trehalose to sorbitol is between 2:1 and 4:1 and concentration of total stabilizer is between 6.5% (w/v) and 9.5% (w/v). The present invention may comprise Poloxamer 188 as a surfactant preferably at a concentration between 0.08% (w/v) and 0.15% (w/v) based on the total volume of the formulation before lyophilization and after reconstitution.

EXPLANATION OF FIGURES

FIG. 1. Schematic protein structure of hy-Fc fused G-CSF

The invention claimed is:

1. A stable pharmaceutical lyophilized formulation prepared by lyophilizing an aqueous preparation comprising:
  (i) 10-80 mg/ml of hybrid Fc fused G-CSF (granulocyte colony-stimulating factor) comprising the sequence of SEQ ID NO: 1;
  (ii) a stabilizer that is a combination of trehalose dihydrate and sorbitol, wherein a concentration of trehalose dihydrate of the aqueous preparation is between 5.0% (w/v) and 7.0% (w/v) based on a total volume of the aqueous preparation, and wherein a concentration of sorbitol of the aqueous preparation is between 1.5% (w/v) and 2.5% (w/v) based on a total volume of the aqueous preparation;
  (iii) at least one poloxamer-based non-ionic surfactant; and
  (iv) an acetate buffer;
  wherein a pH value of the aqueous preparation is between 3.8 and 5.2.

2. The stable pharmaceutical lyophilized formulation of claim 1, wherein the concentration of the hybrid Fc fused G-CSF is between 20 mg/mL and 40 mg/mL based on a total volume of the aqueous preparation.

3. The stable pharmaceutical lyophilized formulation of claim 1, wherein a weight ratio of the trehalose dihydrate to the sorbitol is between 2:1 and 4:1.

4. The stable pharmaceutical lyophilized formulation of claim 1, wherein a concentration of total stabilizer is between 6.5% (w/v) and 9.5% (w/v) based on a total volume of the aqueous preparation.

5. The stable pharmaceutical lyophilized formulation of claim 1, wherein a concentration of the poloxamer-based non-ionic surfactant is between 0.08% (w/v) and 0.15% (w/v) based on a total volume of the aqueous preparation.

6. The stable pharmaceutical lyophilized formulation of claim 1, wherein the pH value of the aqueous preparation is between 4.0 and 5.0.

7. The stable pharmaceutical lyophilized formulation of claim 1, wherein the aqueous preparation comprises:
   (i) 20 mg/mL of the hybrid Fc fused G-CSF;
   (ii) a combination of trehalose dihydrate and sorbitol as the stabilizer, wherein the trehalose dihydrate is at a concentration between 5.0% (w/v) and 7.0% (w/v) based on a total volume of the aqueous preparation, and the sorbitol is at a concentration between 1.5% (w/v) and 2.5% (w/v) based on the total volume of the aqueous preparation;
   (iii) poloxamer 188 as the surfactant, wherein the poloxamer 188 is at a concentration between 0.08% (w/v) and 0.15% (w/v) based on the total volume of the aqueous preparation; and
   (iv) an acetate buffer.

\* \* \* \* \*

SEQUENCE LISTING

```
<160> NUMBER OF SEQ ID NOS: 1

<210> SEQ ID NO 1
<211> LENGTH: 449
<212> TYPE: PRT
<213> ORGANISM: Homo sapiens

<400> SEQUENCE: 1

Met Ala Gly Pro Ala Thr Gln Ser Pro Met Lys Leu Met Ala Leu Gln
1               5                   10                  15

Leu Leu Leu Trp His Ser Ala Leu Trp Thr Val Gln Glu Ala Thr Pro
            20                  25                  30

Leu Gly Pro Ala Ser Ser Leu Pro Gln Ser Phe Leu Leu Lys Cys Leu
        35                  40                  45

Glu Gln Val Arg Lys Ile Gln Gly Asp Gly Ala Ala Leu Gln Glu Lys
    50                  55                  60

Leu Cys Ala Thr Tyr Lys Leu Cys His Pro Glu Glu Leu Val Leu Leu
65                  70                  75                  80

Gly His Ser Leu Gly Ile Pro Trp Ala Pro Leu Ser Ser Cys Pro Ser
                85                  90                  95

Gln Ala Leu Gln Leu Ala Gly Cys Leu Ser Gln Leu His Ser Gly Leu
            100                 105                 110

Phe Leu Tyr Gln Gly Leu Leu Gln Ala Leu Glu Gly Ile Ser Pro Glu
```

```
                    115                 120                 125
Leu Gly Pro Thr Leu Asp Thr Leu Gln Leu Asp Val Ala Asp Phe Ala
        130                 135                 140

Thr Thr Ile Trp Gln Gln Met Glu Glu Leu Gly Met Ala Pro Ala Leu
145                 150                 155                 160

Gln Pro Thr Gln Gly Ala Met Pro Ala Phe Ala Ser Ala Phe Gln Arg
                165                 170                 175

Arg Ala Gly Gly Val Leu Val Ala Ser His Leu Gln Ser Phe Leu Glu
            180                 185                 190

Val Ser Tyr Arg Val Leu Arg His Leu Ala Gln Pro Arg Asn Thr Gly
            195                 200                 205

Arg Gly Gly Glu Glu Lys Lys Lys Glu Lys Glu Lys Glu Glu Gln Glu
        210                 215                 220

Glu Arg Glu Thr Lys Thr Pro Glu Cys Pro Ser His Thr Gln Pro Leu
225                 230                 235                 240

Gly Val Phe Leu Phe Pro Pro Lys Pro Lys Asp Thr Leu Met Ile Ser
                245                 250                 255

Arg Thr Pro Glu Val Thr Cys Val Val Val Asp Val Ser Gln Glu Asp
                260                 265                 270

Pro Glu Val Gln Phe Asn Trp Tyr Val Asp Gly Val Glu Val His Asn
            275                 280                 285

Ala Lys Thr Lys Pro Arg Glu Glu Gln Phe Asn Ser Thr Tyr Arg Val
        290                 295                 300

Val Ser Val Leu Thr Val Leu His Gln Asp Trp Leu Asn Gly Lys Glu
305                 310                 315                 320

Tyr Lys Cys Lys Val Ser Asn Lys Gly Leu Pro Ser Ser Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Gln Glu Glu Met Thr Lys Asn Gln Val Ser Leu Thr
            355                 360                 365

Cys Leu Val Lys Gly Phe Tyr Pro Ser Asp Ile Ala Val Glu Trp Glu
        370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Arg Leu Thr Val Asp Lys
                405                 410                 415

Ser Arg Trp Gln Glu Gly Asn Val Phe Ser Cys Ser Val Met His Glu
            420                 425                 430

Ala Leu His Asn His Tyr Thr Gln Lys Ser Leu Ser Leu Ser Leu Gly
        435                 440                 445

Lys
```